Dec. 2, 1941.  M. SCHWARTZ ET AL  2,264,595
FLASHLIGHT ATTACHMENT FOR CAMERAS
Filed June 21, 1940
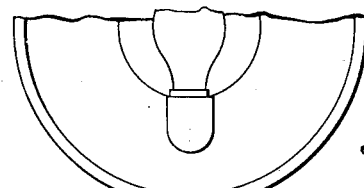
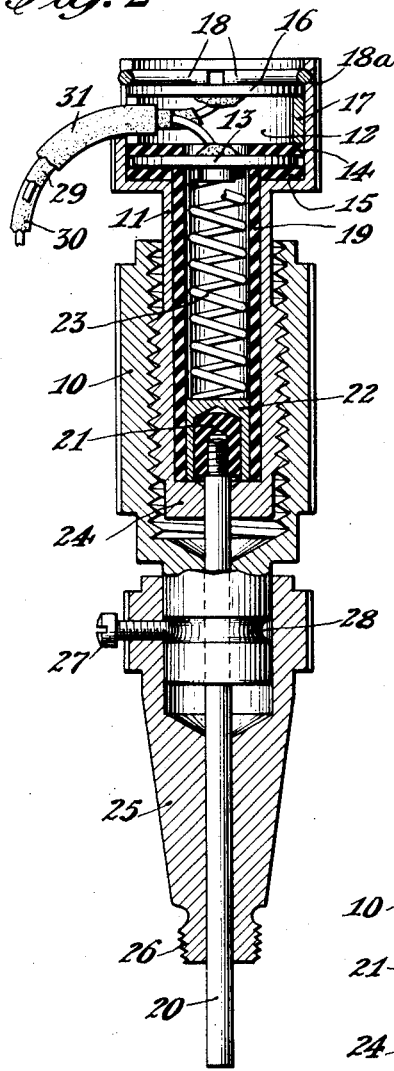
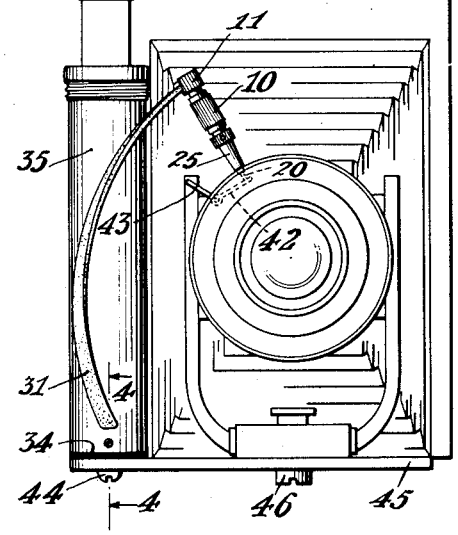
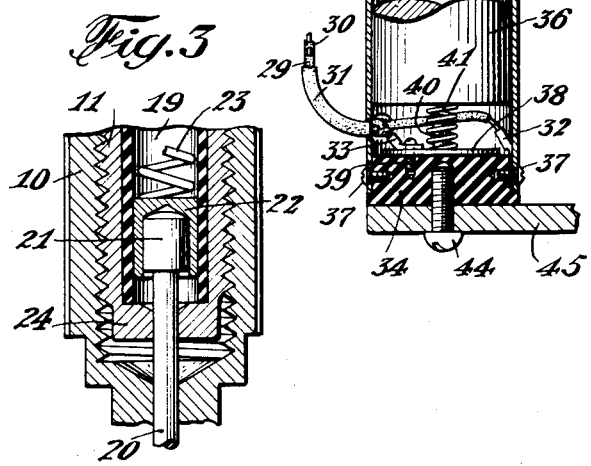
INVENTORS
MORRIS SCHWARTZ
WILLIAM CASTEDELLO
BY
ATTORNEY Patented Dec. 2, 1941

2,264,595

UNITED STATES PATENT OFFICE 2,264,595

FLASHLIGHT ATTACHMENT FOR CAMERAS

Morris Schwartz, New York, and William Castedello, Huntington, N. Y., assignors to The Kalart Company, Inc., Stamford, Conn.

Application June 21, 1940, Serial No. 341,660

6 Claims. (Cl. 67—29)

Our invention relates to a device which is attachable to a camera and operable in conjunction with the shutter actuating mechanism of said camera, to synchronize the optimum illumination of a flashlight lamp with the opening of the shutter of said camera.

Our invention has particular adaptation for use with cameras whereby the shutter releasing mechanism is employed to actuate the flashlight means.

Our invention is somewhat similar to the subject matter disclosed in application Serial No. 220,444 filed July 18, 1938, for Photographic apparatus, and which matured into Patent No. 2,225,596 on Dec. 17, 1940.

Our invention further relates to that type of apparatus wherein an electric battery and flashlight bulb is attachable to the camera proper and wherein the flashlight lamp is electrically operated by a control means attached to the cable release socket of the camera.

An object of our invention is to provide a simple device, attachable to cameras, for operating through the medium of manual or mechanical contact with the shutter releasing lever and an electric switch mechanism, which will close the electric circuit to the flash lamp with the opening of the shutter.

A further object is to provide a device of the character described which will be simple in construction and operation and economical in cost of manufacture.

These and other objects hereinafter disclosed are attained by the device illustrated in the accompanying drawing, which forms a part of this specification, and in which:

Fig. 1 is a view of a camera showing the battery, flashlight, socket and bulb. The figure further shows a double conductor cord connecting the battery and synchronizer unit.

Fig. 2 is an enlarged sectional detail of the synchronizer unit or switch operating unit; and also showing the parts in position when the electric circuit is closed.

Fig. 3 is a much enlarged fragmentary sectional view of the control unit shown in Fig. 1, and furthermore shows the parts thereof in position when the electric circuit is open.

Fig. 4 is a section taken on line 4—4 of Fig. 1.

Referring to the parts in detail, 10 designates the casing of an electric synchronizer unit open at one end and threaded inside to receive a threaded cylindrical member 11 which is adjustable therein. One end of said cylindrical member 11 is enlarged at one end to form a compartment 12 within which is held a conductor plate 13 interposed between insulating plates 14 and 15. A second conductor plate 16 is placed above said insulator plate 14 and separated therefrom by means of a separator ring 17 and the aforesaid parts are held securely in place by means of a split ring 18, which is nested in groove 18ª (see Fig. 2). The plate 13 is of smaller diameter than the diameter of the said compartment to avoid electric contact therewith. Enclosed within said cylindrical member 11 there is provided a tubular member of insulating material 19 which rests between the aforesaid metallic plate 13 and the closed end portion 24 of the threaded cylindrical member 11. A plunger shaft 20, which is adapted to contact with the shutter releasing mechanism on the camera, movably projects through the end of said threaded cylindrical member. Said member is capped by an insulating button or knob 21 which is securely attached to the shaft 20 and over said button 21 a cupped contacting conductor member 22 is adapted to rest. The lower edge of said conductor member extends beyond the lower edge or surface of the said button 21 as shown in Figs. 2 and 3. The tube of insulating material 19 rests within the said cylindrical member 11, between the said cupped conductor member 22 and said cylindrical member.

Interposed between the said conductor plate 13 in said compartment end and said cupped conductor member 22 is a compressed spring 23 the function of which serves to bring the edge of said cupped conductor member 22 into engagement with closed end proportion 24 of the cylindrical member 11, underneath said cupped conductor thereby closing an electric circuit at that point as will be hereinafter more fully described.

At the end of the casing 10 there is attached a tapered end member 25, having a threaded portion 26. Said threaded portion provides means for attachment to the cable release socket that is mounted on the camera objective shown in Fig. 1. The tapered end member is pivotally connected to the end of said casing of the synchronizer unit by means of a set screw 27 which engages freely in annular groove 28. Said arrangement facilitates attachment to the cable release socket. The shaft 20 movably projects through and beyond the end of said member 25.

Soldered or otherwise securely attached to the aforementioned conductor plates 13 and 16 are terminal wires 29 and 30 respectively of a double conductor cord 31. Said wires terminate into lugs 32 and 33. The lugs are attached to an insulating block 34 secured at one end of a case or container 35 for the battery 36. The terminal 32 is held in place by means of a screw 37 and is interposed between the said insulating block 34 and the metal battery casing 35 to insure an electrical contact at that point. The lug 33 is secured against a conductor plate 38 and is suitably fastened to said insulating block 34 by means of a screw 39. Said screw 39 makes an electric contact with the conductor plate 38.

Securely attached to said conductor plate 38 is a stud 40. Around and above said stud a spring 41 is contacted. The spring 41 contacts with the contact end of said battery 36 thus making electrical contact at that point.

In Fig. 1 there is shown in broken line 42, a portion of the shutter releasing mechanism. Said portion of said shutter releasing mechanism is moved or actuated by the finger member 43. The shutter releasing mechanism or part thereof, while not a specific part of this invention is nevertheless important to the operation of our invention inasmuch as said mechanism provides a means for holding the plunger of the synchronizing unit in its retarded or open circuit position when the shutter is closed. The plunger shaft 20 is held against the lever portion of the releasing mechanism 42 through the medium of the tension of the spring 23.

When the operator of the camera lifts the finger release 43, the lever portion 42 of the shutter mechanism moves in a downward direction. The plunger shaft 20 under tension of the spring 23 tends to always remain in resilient contact with the lever portion 42 and will follow the movement thereof. Therefore, upon the lifting of the finger release 43 with the consequent movement of the lever portion 42 in a downward direction sufficiently to release the camera shutter, the shaft 20 following the movement of said lever portion will move accordingly in a downward direction sufficiently to cause the conductor 22 to contact with the closed end portion 24 of the cylindrical member 11 thereby closing the flashlight circuit.

The case 35 carrying the battery and flashlight is attachable to a camera, as shown in Fig. 1. In Fig. 1 there is further shown a bar support 45 which is attached to the camera by means of tripod screw 46. The battery case 35 is also supported by the bar 45 through the medium of the screw 44.

The electrical circuit can be traced from one terminal of battery 36, thence passing through the flashlight bulb to the battery container 35, and thence to terminal 32, to conductor wire 29, to plate 13, to compression spring 23, to cupped conductor member 22, cylindrical member 11, conductor plate 16, conductor wire 30, terminal 33, plate 38 and spring 41 to the opposite terminal of the battery 36, which completes the circuit.

When the device is set ready to make an exposure, the plunger shaft 20 is in contact with the part 42 of the shutter releasing mechanism of the camera and will, through its contact, be normally held in its raised or open circuit position as shown in Fig. 3. The circuit break occurs between the lower end of the cupped conductor member 22, and the end 24 of the said cylindrical member 11, as heretofore explained.

When an exposure is to be made the shutter releasing mechanism is actuated through the medium of the finger tripping member 43. The movement of this part of the shutter releasing mechanism will, as already stated, cause the tension spring 23 to drop or force the cupped member 22 to contact the end 24 of the threaded cylindrical member 11 thereby closing the electric circuit and the consequent flashing of the lamp bulb (see Fig. 2). When the finger is lifted after an exposure, the parts of the said releasing mechanism resume their normal positions, thereby causing the circuit to be broken or opened between the cupped conductor member and the casing. The device is then ready for the next following exposure.

To fix the relative position of the plunger shaft 20 with respect to the engaging shutter release mechanism 42, the cylindrical member 11 is adjustable within the casing 10 as shown in Figs. 2 and 3.

In common practise the cable release on a camera objective operates the shutter; and in some cases said cable release operates both shutter and flashlight synchronizer unit. In the present invention, the objective shutter is tripped by the usual finger trip; said finger tripping function acts to simultaneously trip the shutter and to set off the flash in a flashlamp through the medium of the arrangement attachable to the cable release socket as shown in Fig. 1.

While the drawing and description disclose the preferred arrangement and construction of our invention, it will be obvious that modifications in some may be employed without departing from the spirit thereof. It is, therefore, not intended to limit our invention to the particular detail of construction shown.

What we claim is:

1. In a shutter and flashlight synchronizer attachment for a camera, said attachment attachable to the cable release socket mounted on said camera, said attachment including a casing, a cylindrical member adjustable therein, a plunger shaft reciprocally movable within said casing and said cylindrical member, spring means within said cylindrical member, a contacting conductor member mounted on said plunger shaft, a fixed contacting portion in said casing to cooperatively contact with said conductor contacting member, said plunger shaft normally being in engagement with the releasing lever portion of the shutter releasing means on said camera, said releasing lever portion normally engaging said shaft to hold said contacting conductor member out of engagement with said fixed contacting portion against the action of said spring means, and the manual set-off of said shutter releasing means to cause said plunger shaft under the action of said spring means to follow the downward movement of said releasing lever portion, said downward movement of said plunger shaft causing the contacting of said contacting conductor member thereon with said fixed contacting portion thereby closing a flashlight circuit, said contacting conductor member and said contacting portion being included in the circuit aforesaid.

2. In a shutter and flashlight synchronizing attachment for a camera, a synchronizer unit adapted to be attached to a cable release socket mounted on said camera, said synchronizer unit including a casing, a cylindrical member adjustable therein, a threaded end member pivotably connected to said casing, a plunger shaft reciprocally movable in said end member, casing and cylindrical member, a compression spring within said casing, a contacting conductor member mounted upon said plunger shaft; a fixed contacting portion within said attachment in electrical cooperative contact relation with said contacting conductor member, said plunger shaft extending through said cable socket and held in normal resilient contact engagement against the releasing lever portion of the shutter tripping means of said camera through the medium of said compression spring whereby said contacting conductor is held out of contact with said fixed contacting portion, said shaft following the downward movement of said releasing lever portion upon the manual tripping of said releasing lever of said shutter tripping means, said downward movement of said shaft causing the electrical contacting of said contacting conductor member with said contacting portion in said attachment to thereby close a flashlight circuit in which said contacting conductor member and said fixed contacting portion are included.

3. In a shutter and flashlight synchronizer attachment for a camera, said attachment attachable to the cable release socket mounted on the camera, said attachment including a casing, a cylindrical member adjustable thereon, a plunger shaft reciprocally movable within said casing and said cylindrical member, spring means within said cylindrical member, a contacting conductor member mounted on said plunger shaft, a fixed contacting portion within said casing in cooperative contact relation with said contacting conductor member, said plunger shaft resiliently engaging the camera shutter tripping means through said cable release socket under the action of said spring means thereby holding said conductor out of contact with said fixed contacting portion; the manual operation of said shutter tripping means causing the tripping of said camera shutter simultaneously with the downward movement of said plunger shaft and said conductor member attached thereto, whereby said contacting conductor member contacts said contacting portion to close a flashlight circuit, said contacting conductor member and said fixed contacting portion being included in the circuit aforesaid.

4. In a shutter and flashlight synchronizer attachment for a camera, said attachment attachable to the cable release socket mounted on the camera, said attachment including a casing, a cylindrical member adjustable thereon, a plunger shaft reciprocally movable in said casing and said cylindrical member, spring means within said cylindrical member, a contacting conductor member mounted on said plunger shaft, a fixed contact portion within said casing in cooperative contact relation with said contacting conductor, said plunger shaft being in resilient engagement with the releasing lever portion of the shutter releasing means on said camera contiguous to said cable release socket and normally held in open circuit position thereby, said shaft held in constant resilient engagement with said releasing lever through the medium of said spring means; and the manual set-off of said shutter releasing means causing said plunger shaft to follow the downward movement of said releasing lever of said shutter releasing means, thereby effecting the engagement of said contacting conductor on said shaft with said fixed contact portion to close a flashlight circuit, said contacting member and said fixed contact portion included in the flashlight circuit aforesaid.

5. In a shutter and flashlight synchronizer attachment for a camera, said attachment attachable to the cable release socket mounted on said camera, a shaft in said attachment, a contacting member mounted on said shaft, spring means in said attachment, a contacting conductor member mounted on said shaft, said contacting conductor member in cooperative relation with a fixed contact portion in said attachment, said shaft being held in resilient engagement with the lever portion of the shutter tripping means on said camera through the medium of said spring means, said lever portion thereby holding said conductor out of contact with said contacting portion; the manual set-off of said shutter tripping means causing the lowering of said lever portion and the consequent lowering of said shaft thereby causing the contacting of said conductor member and said fixed contact portion to close a flashlight circuit, said conductor member and said fixed contacting portion included in the circuit aforesaid.

6. In a shutter and flashlight synchronizer unit adapted to be attached to a cable release socket mounted on a camera, said synchronizer unit including a casing, a cylindrical member adjustable therein, a threaded end member pivotally connected to said casing, a plunger shaft reciprocally movable in said end member, casing and cylindrical member, a contacting conductor member mounted upon said plunger shaft, a conductor plate within said cylindrical member, a compression spring within said cylindrical member, said spring adapted to hold said plunger shaft in resilient engagement with the releasing lever portion of the shutter tripping means, said lever portion thereby holding said conductor member out of contact with said conductor plate; and the manual set-off of said shutter tripping means causing the downward movement of said lever portion thereof thereby permitting said compression spring to move said plunger shaft to close a flashlight circuit, said circuit including said conductor member and said conductor plate.

MORRIS SCHWARTZ.
WILLIAM CASTEDELLO.